US008620641B2

(12) United States Patent
Farnsworth et al.

(10) Patent No.: US 8,620,641 B2
(45) Date of Patent: Dec. 31, 2013

(54) INTELLIGENT ELISION

(75) Inventors: Andrew Farnsworth, Bromsgrove (GB); David Noel Vanden Heuvel, Ottawa (CA)

(73) Assignee: BlackBerry Limited, Waterloo, Ontario (CA)

(*) Notice: Subject to any disclaimer, the term of this patent is extended or adjusted under 35 U.S.C. 154(b) by 1167 days.

(21) Appl. No.: 12/122,008

(22) Filed: May 16, 2008

(65) Prior Publication Data
US 2009/0287470 A1   Nov. 19, 2009

(51) Int. Cl.
G06F 17/20 (2006.01)
G06F 17/21 (2006.01)
G06F 17/00 (2006.01)

(52) U.S. Cl.
USPC .................. 704/1; 704/10; 715/251

(58) Field of Classification Search
USPC .......................................... 715/251
See application file for complete search history.

(56) References Cited

U.S. PATENT DOCUMENTS

| 6,279,018 | B1* | 8/2001 | Kudrolli et al. ............... 715/234 |
| 6,452,597 | B1* | 9/2002 | Goldberg et al. ............. 345/472 |
| 7,345,688 | B2* | 3/2008 | Baudisch et al. ............. 345/467 |
| 7,503,001 | B1* | 3/2009 | Lekutai ........................ 715/261 |
| 7,515,903 | B1* | 4/2009 | Cast ............................. 455/413 |
| 7,536,297 | B2* | 5/2009 | Byrd et al. ....................... 704/10 |
| 7,827,315 | B2* | 11/2010 | Kirkland ....................... 709/247 |
| 2002/0087985 | A1 | 7/2002 | Kamen et al. |

FOREIGN PATENT DOCUMENTS

WO             00/38076 A1    6/2000

OTHER PUBLICATIONS

Extended European Search Report dated Oct. 9, 2008. Citations therein were submitted in an IDS dated Oct. 10, 2008.

* cited by examiner

*Primary Examiner* — Jesse Pullias
(74) *Attorney, Agent, or Firm* — Perry + Currier Inc.

(57) ABSTRACT

A user interface routine includes an intelligent elision routine having a plurality of language objects, plurality of abbreviation objects, and a plurality of preference objects. Each language object has an associated abbreviation object and preference object is an abbreviatable language object. The user interface routine and/or the intelligent elision routine is structured to determine a text field's length, also identified as a limited space, receive a text string and replace selected language objects in the text string with the associated abbreviation objects to create an abbreviated text string. The process is, preferably, repeated on the abbreviated text string until the abbreviated text string is shorter than the limited space or until no more abbreviatable language objects are in the text string.

16 Claims, 3 Drawing Sheets

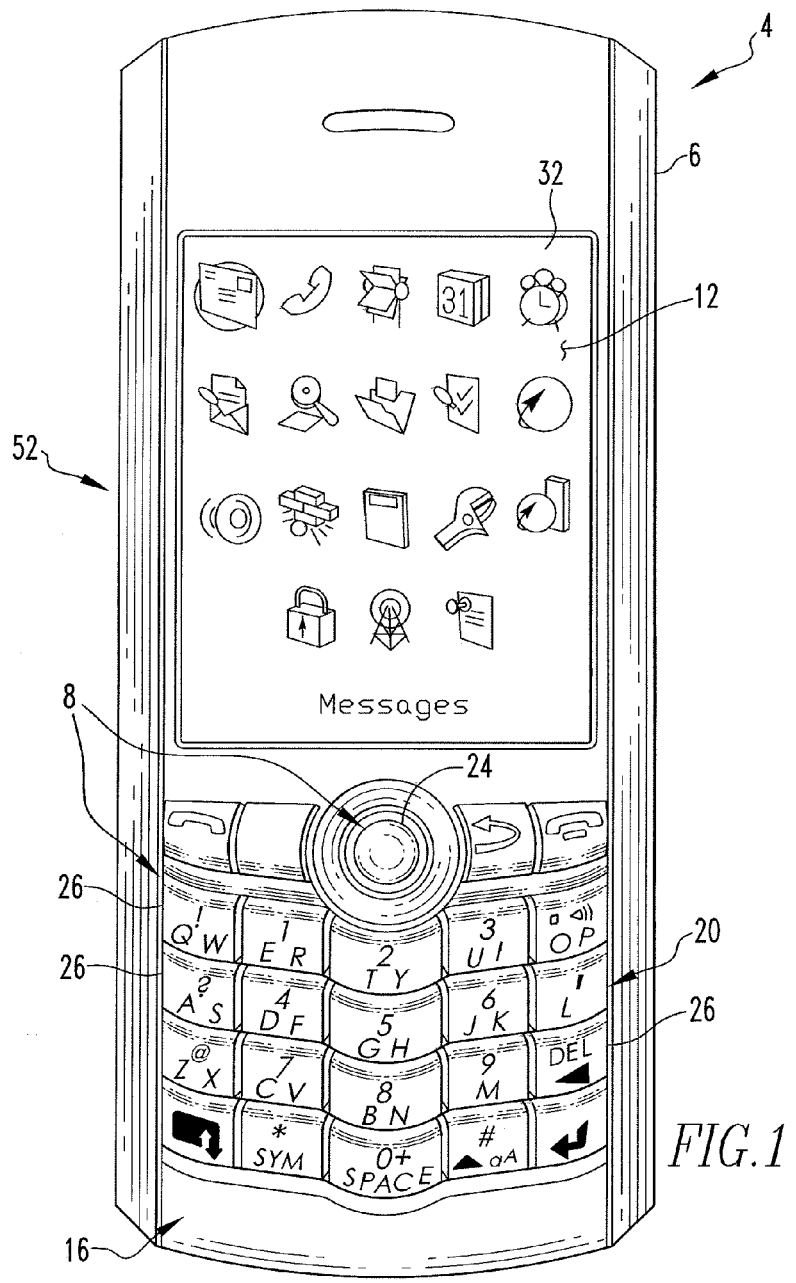
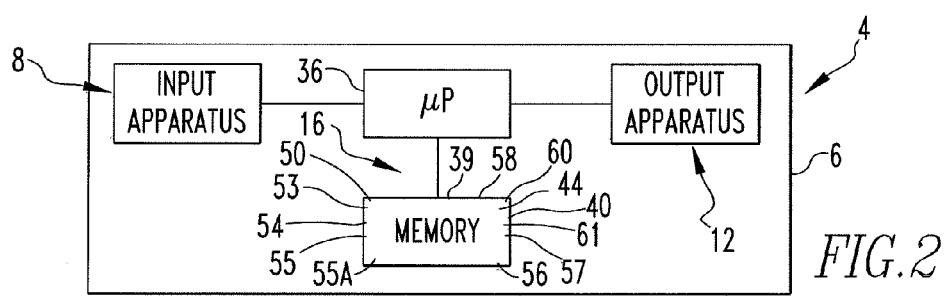
FIG.1
FIG.2

INTELLIGENT ELISION

BACKGROUND

1. Field

The disclosed and claimed concept relates generally to handheld electronic devices and, more particularly, to a handheld device having a routine structured to perform intelligent elision.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices. Such devices typically include a display and a processor apparatus. The display is typically only a few square inches in size. The processor apparatus includes memory and a processor. The processor apparatus is structured to execute one or more routines stored in the memory. The processor apparatus is coupled to, and in electronic communication with, the display. At least one routine is structured to present a user interface on the display.

The user interface is structured to provide a visual output and visual communications to the user. While the visual output may be in the form of graphics, a considerable amount of data is presented as text. Examples of routines that use textual data include, but are not limited to, an email inbox/outbox, a calendar or datebook, and/or an address book. Such routines typically include an initial, summary screen that presents a number of operators and a summary, or, as described below, more typically a partial summary. The summary may be a subject field or the actual text of the entry or any other shorter version of a more detailed entry, message or file. For example, an email inbox/outbox routine typically presents summary screen with operators such as, but not limited to, a menu bar and buttons such as "new message," "reply," "forward," and so forth. Continuing with the example of an email inbox/outbox routine, the summary screen typically displays an icon, an address field, and a subject field. The icon is an indication of the status of the message, e.g. new, previously opened, sent, and so forth. The address field indicates from whom the message was received or to whom the message was sent. The subject field is a user provided summary and typically relates to the contents of the message. As is known, a user may select, or otherwise open, a message whereupon the summary screen is changed into a message screen that presents the complete message as well as the complete address and subject. Other types of text routines may present different types of data in the summary screen, but the overall operation is similar in that the summary screen presents limited information for many different entries and those entries may be further opened to see additional information.

Many users have become adept at creating short summaries for several reasons including, but not limited to, because they understand there is limited space to present summaries, because they believe electronic communication is informal, or because it is less time consuming to type short summaries; however, many users still create email subject lines, calendar entries, and/or address book entries that are long text strings. For example, it is not too unusual for a user sending a short email message to type the entire message in the subject line and forego typing any text in the body of the email. Also, entries created by a routine, for example, a message announcing a change in a scheduled meeting that is created by a scheduling/calendar routine, and which is not physically typed by a user, may have a considerable length. Further, there are users who just prefer to type longer and/or formal summaries.

As noted above, the display is typically only a few square inches and usually has a width of about two to five inches. Given this size of screen, which is partially occupied by the operators, the available space to present the summary is limited. One option is to allow each summary to be presented in full over several lines. This may limit the number of messages, or entries, presented at one time in the summary screen. Most users, however, prefer to see the summaries of multiple messages/entries at one time. Thus, the typical text routine is structured to truncate the amount of text presented in each field thereby creating partial summaries. For example, in an email routine, the partial summaries present a limited numbers of characters in the address field and in the subject field and, as stated above, are more accurately described as partial summaries.

The problem with truncating a summary is that the more important or relevant text may be cut from the presented summary. For example, if a user had typed an entire message in the subject field which read "The morning meeting has been moved to room 42" and that summary is truncated at twenty-five characters, the resulting subject field would be presented as, "The morning meeting has b . . . ." Thus a user would have to completely open the message to see the complete subject field.

BRIEF DESCRIPTION OF THE DRAWINGS

A full understanding of the disclosed and claimed concept can be obtained from the following Description when read in conjunction with the accompanying drawings in which:

FIG. 1 is a front elevational view of an exemplary handheld electronic device in accordance with the disclosed and claimed concept upon which is performed an improved method in accordance with the disclosed and claimed concept;

FIG. 2 is a schematic depiction of the handheld electronic device of FIG. 1.

Similar numerals refer to similar parts throughout the specification.

DESCRIPTION

Figure 3:
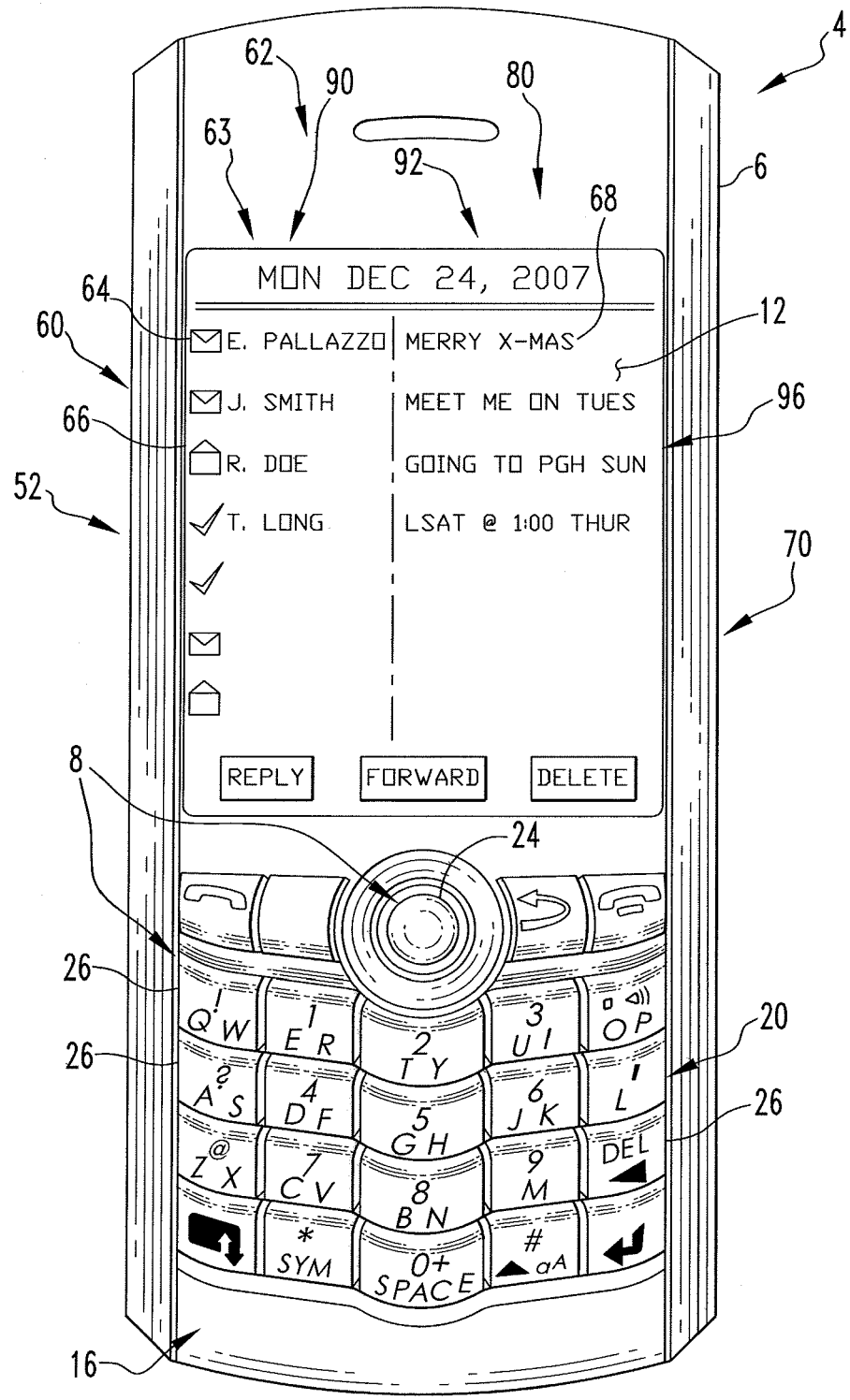
FIG. 3 is a front elevational view of an exemplary handheld electronic device showing the user interface.

As used herein, "intelligent elision" is the act of utilizing standard and non-standard abbreviations to reduce, or substantially reduce, a string of text to an allotted number of characters, for a monospaced font, or an allotted length, for a proportional font.

As used herein, the word "select," and variations thereof, when used in association with a field, element, object, or icon means that a field, element, object, or icon is identified as the field, element, object, or icon upon which the processor apparatus 16 thereafter performs an associated function. As is known, a field, element, object, or icon may be selected by placing a cursor over the field, element, object, or icon and followed by an actuation of an input mechanism. For example, a trackball may be used to position a cursor over a field, element, object, or icon and depressing the trackball or another key/button may be the input mechanism. This process typically highlights the field, element, object, or icon over which the cursor had been placed. This process is commonly known as "clicking" on an icon, etc.

As used herein, the word "actuate," and variations thereof, when used in association with an element, object, or icon means that a "selected" element, object, or icon is activated, typically by second actuation of the input mechanism. This process is commonly known as "double-clicking" on an icon, etc.; however, it is noted that routines may be structured to actuate an element, object, or icon by a single-click. For example, a routine may be initiated by placing a cursor over the element, object, or icon, followed by an actuation of an input mechanism.

As used herein, "present" and variations thereof meaning "to show," relate to an electronic construct created by a routine being executed in a processor apparatus and transmitted as a signal to a display which converts the signal into a viewable image. Thus, it is understood that when a routine "presents" an image, the routine is "presenting" the image via the processor apparatus and display.

As used herein, "abbreviations" also includes acronyms.

Generally, the present concept provides a routine structured to perform intelligent elision in a summary screen. The intelligent elision routine 54 is preferably incorporated into a user interface routine, but may also operate as a "background" routine. That is, the intelligent elision routine 54 may be active and work in association with other routines. The intelligent elision routine 54 includes a plurality of language objects 55, including abbreviatable language objects 55A, plurality of abbreviation objects 56, and a plurality of preference objects 57. Each language object 55 that has an associated abbreviation object 56 and preference object 57 is an abbreviatable language object 55A. The intelligent elision routine 54 is structured to determine a text field's 68 length, hereinafter identified as a limited space 80, receive a text string 62 and replace selected language objects 55 in the text string 62 with the associated abbreviation objects 56 to create an abbreviated text string 62. The process is, preferably, repeated on the abbreviated text string 62 until the abbreviated text string 63 is shorter than the limited space 80 or until no more language objects 55 have an associated abbreviation object 56. Thus, the method provides for presenting the abbreviated text string 62 in a limited space 80.

An improved handheld electronic device 4 in accordance with the disclosed and claimed concept is indicated generally in FIG. 1 and is depicted schematically in FIG. 2. The improved handheld electronic device 4 comprises a housing 6, and further comprises an input apparatus 8, an output apparatus 12, and a processor apparatus 16 disposed on the housing 6. The input apparatus 8 provides input to the processor apparatus 16. The processor apparatus 16 provides output signals to the output apparatus 12.

The input apparatus 8 comprises a keyboard 20 and a track ball 24. The keyboard 20 in the exemplary embodiment depicted herein comprises a plurality of keys 26 that are each actuatable to provide input to the processor apparatus 16. The track ball 24 is rotatable to provide navigational and other input to the processor apparatus 16, and additionally is translatable in a direction inwardly toward the handheld electronic device 4 to provide other input, such as selection inputs. The track ball 24 is freely rotatable on the housing 6 and thus is able to provide navigational inputs in the vertical direction, i.e., the up-down direction, in the horizontal direction, i.e., the left-right direction, as well as combinations thereof. The plurality of keys 26 and the track ball 24 serve as input members which are actuatable to provide input to the processor apparatus 16. The exemplary output apparatus 12 comprises a display 32.

Many of the plurality of keys 26 each have a plurality of letters, i.e., linguistic elements, assigned thereto. For instance, one of the plurality keys 26 has assigned thereto the letters "A" and "S". Another of the plurality of keys 26 has assigned thereto the letters "Q" and "W". The letters of the exemplary keyboard 20 are in an arrangement of a reduced QWERTY keyboard.

Examples of other input members not expressly depicted herein would include, for instance, a mouse or track wheel for providing navigational inputs, such as could be reflected by movement of a cursor on the display 32, and other inputs such as selection inputs. Still other exemplary input members would include a touch-sensitive display, a stylus pen for making menu input selections on a touch-sensitive display displaying menu options and/or soft buttons of a graphical user interface (GUI), hard buttons disposed on the housing 6 of the handheld electronic device 4, and so on. Examples of other output devices would include a touch-sensitive display, an audio speaker, and so on.

The processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM (s), FLASH, and the like that provide a storage register, i.e., a machine readable medium, for data storage such as in the fashion of an internal storage area of a computer, and can be volatile memory or nonvolatile memory. The memory 40 has stored therein a number of routines 44 that are executable on the processor 36. As employed herein, the expression "a number of" and variations thereof shall refer broadly to any nonzero quantity, including a quantity of one. One of the routines 44 is a disambiguation routine that is operable to disambiguate ambiguous text input, such as when one of the plurality of keys 26 having a plurality of letters assigned thereto is actuated.

The routines 44 may include a calendar routine 44, a message routine 44, such as, but not limited to, an e-mail routine, an address book routine 44 or other such routines 44. Each routines 44, such as a calendar routine 44 or an e-mail routine 44, may include a user interface routine 50 structured to present a user interface 52. Alternately, the memory 40 may include the user interface routine 50 as a separate routine that works in conjunction with the other routines 44. The user interface routine 50 is structured to present the user interface 52 on the display 32, as shown in FIG. 3. The user interface routine 50, preferably, includes, or works in conjunction with, an intelligent elision routine 54.

The intelligent elision routine 54, and therefore the user interface routine 50, includes a plurality of objects 53 including a plurality of language objects 55, a plurality of abbreviated language objects 56, and a plurality of preference objects 57. The language objects 55 are typically words, but may also include phrases of multiple words as well as language objects that incorporate numbers or other symbols. Each of the plurality of language objects 55 has an associated abbreviated language object 56. Hereinafter, each of the plurality of language objects 55 that has an associated abbreviated language object 56 is referred to as an "abbreviatable language object" 55A. The abbreviated language objects 56 include standard abbreviated language objects 58 as well as non-standard abbreviated language objects 59. Standard abbreviated language objects 58 include well known abbreviations as found in a typical dictionary or other formal list of abbreviations. For example, "Tues." is the standard abbreviation for "Tuesday." Non-standard abbreviated language objects 59 may be an informal abbreviation that has yet to be accepted as formal, e.g., "LOL" is well known to users of the Internet chat rooms as an acronym for the phrase, "laughing out loud." It is noted that when an abbreviation is actually an acronym, the user interface routine 50 will present the abbreviated language object 59 in capital letters. Other non-standard abbreviated language objects 59 may be a shortening of a word in a manner that reduces the number of letters, but still provides enough information for a user to determine what the non-abbreviated word is. For example, the word "fresh" may be shortened to be "frsh." Another non-standard abbreviation may be the elimination of a word, or a null abbreviated language object 61. That is, words such as "the" and/or "a" may, typically, be removed from a subject line 92 (discussed below) without affecting the clarity of the text string 62 (discussed below). Another non-standard abbreviation may include an abbreviation of two or more other abbreviations. For example, if an office had conference rooms named after months, e.g. the September Room or the October Room, an initial abbreviation may be "Sept. Room." However, if further abbreviation is required, this abbreviated phrase could be further abbreviated to "SeptR" or "Sept.Rm." Another non-standard abbreviation may include the use of a small image or icon including, but not limited to, various trademarks. For example, a red octagon, even without visible lettering, is generally associated with a stop sign. Thus, the text string, "stop the presses" could have the word "stop" abbreviated with a red octagon icon.

Further, portions of selected abbreviatable language objects 55A may be replaced by null characters, that is, with nothing. This type of replacement is generally limited to email addresses wherein the portion of the address after the name, beginning with the "@" symbol, may be deleted from the text string 62. For this function, the interface routine 50 is structured to temporarily add a received email address to the plurality of abbreviatable language objects 55A and create a corresponding temporary abbreviated language object 56 having the truncation described above. The abbreviatable language objects 55A may further include a list of typical first names which may be abbreviated to an initial.

It is further noted that not all language objects 55 may be abbreviated. Thus, not all words and phrases in a given language are abbreviatable language objects 55A.

Each abbreviatable language objects 55A also has an associated preference object 57. A preference object 57 has a rank, or shares a rank with other preference objects 57, wherein commonly replaceable abbreviatable language objects 55A have a low rank and less commonly replaceable abbreviatable language objects 55A have a high rank. For example, a common abbreviatable language objects 55A, such as the word "Tuesday" would have a relatively low preference object 57. Thus, as described below, the abbreviatable language objects 55A "Tuesday" would be one of the first abbreviatable language objects 55A to be replaced by the associated abbreviated language object 56. The rank of each preference object 57 is typically related to how commonly known the abbreviated language object 56 is, but may also be related to the length of abbreviatable language objects 55A. For example, while not as commonly well known as the abbreviation for the days of the week, the phrase "Law School Admission Test" may be abbreviated as "LSAT." As this phrase is relatively long, the associated preference object 57 associated with this abbreviatable language objects 55A may be ranked the same as, or lower than, a commonly abbreviated word such as "Tuesday."

The routines 44 having a user interface 52 are, typically, structured to present both graphics 60 and text strings 62. The graphics 60 may include icons 64, outlines 66 around fields 68, buttons 70 and so forth. Text strings 62 are typically presented in a field 68. That is, a field 68 is an area on the user interface 52 structured to display a text string 62. The routine 44 presenting a field 68 is typically structured to present the field 68 in a predefined, fixed area, or, in an area that adapts to the length of the text string 62 to be presented therein. An example of a field that adapts to the length of the text string 62 to be presented therein is the body of an email message. Generally, the longer the message, the longer the field 68. That is, as a user adds more text, the field 68 grows in length to accommodate the text. Similarly, the handheld electronic device 4, or more specifically the user interface routine 50 on the receiving handheld electronic device 4, also adapts the size of the text field 68 in the email message to accommodate the message received.

Conversely, a field 68 having a predefined, fixed area is a limited space 80. It is understood that selected handheld electronic devices 4 may include one or more displays, e.g. an outside display and an inside display (multiple displays not shown), or a display structured to be rotated or viewed in different orientations (not shown). In such devices, the user interface routine 50 typically adjusts the user interface 52 for the active display or orientation of the display. It is further understood that the concept as described below applies to the user interface 52 regardless of which display is active and/or the orientation of the display. That is, for example, a smaller outer display (not shown) may have a limited space 80 with a length of thirty characters while a larger, inner display (not shown) may have a limited space 80 with a length of fifty characters. Thus, it is understood that, as the interface routine 50 is the routine presenting the image, the interface routine 50 is provided with data representing the size/length of the limited space 80, related to which display is being used and/or the orientation of the display.

It is further understood that a user interface routine 50 may provide for minimally adjustable limited space 80. For example, in an email routine 44, the user interface routine 50 may present a summary screen 94 (described below) which provides a column for addresses and a column for subject lines. Each of these elements are text strings 62 and each are presented in adjacent limited spaces 80; however, the user may customize the adjacent limited spaces 80 by allowing the user to expand one limited space 80 while minimizing the adjacent limited space 80. Again, as the interface routine 50 is the routine presenting the image and allowing the user to adjust the size of the limited spaces 80, the interface routine 50 is provided with data representing the size/length of the limited space 80. Thus, regardless of how the user interface 52 is presented, e.g. one of several displays or on a user adjusted text field 68, the interface routine 50 is provided with data representing the size/length of the limited space 80.

It is further noted that the number of characters that may be presented in a limited space 80 also depends upon the characteristics of the font being used. As the font presented on the display is controlled by the interface routine 50, the interface routine 50 is structured to determine whether a text string 62, or an abbreviated text string 63 (discussed below), has a length that is longer than the limited space 80. That is, the interface routine 50 is structured to determine the actual length of the limited space 80 and how long a given text string 62, or abbreviated text string 63, is and determine whether that text string 62, or abbreviated text string 63, as presented in the active font may fit in the provided limited space 80; however, the length of a limited space 80 shall hereinafter be set forth as a measure of "character spaces" and the length of words shall be represented by the number of characters used therein. This convention shall be used so that the reader may count the letters in a language object 55 and compare that number to the character spaces in a described limited space 80 and thereby see which characters are removed in an abbreviated text string 63. It is understood, however, that not all fonts are Courier-type, mono-space fonts wherein all characters occupy the same width and that the interface routine 50 is structured to accommodate fonts wherein letters have different widths and abbreviate accordingly.

As discussed below, an email routine 44 shall be used as an example; however, it is understood that other routines that utilize text fields 68 with limited space 80 may incorporate a similar user interface 52. The email routine 44 is structured to send and receive messages. The email routine 44 includes a user interface routine 50 that is structured to present the user interface 52 on the display 32. As is known, an email message includes a message that is a text string 62, as well as additional data related to the message. Typically, the additional data includes a text string 62 representing the sender, typically identified as a return address 90, and a text string 62 that is a subject line 92. The email routine 44 typically presents a summary screen 94 that displays the return address 90 and subject line 92 for several messages in a columnar form. The summary screen 94 may include an icon 64 representing the message as either new or read. Further, the summary screen 94 also presents one or more menus and/or icons 64 relating to the use and manipulating the messages, e.g. an icon for forwarding a message or deleting a message. As is known in the art, a user may access the actual message by selecting/actuating on one of the fields or icons associated with the message. On the summary screen 94, the return address 90 and subject line 92 are typically adjacent limited spaces 80. That is, each of the return address 90 and subject line 92 are text fields 68 having a limited length.

The email routine's 44 user interface routine 50, preferably, includes, or works in conjunction with, an intelligent elision routine 54. In accordance with the preferred embodiment, hereinafter the user interface routine 50 shall be described as performing the intelligent elision. It is noted that separating the intelligent elision routine 54 from a user interface routine 50 and having the two routines 50, 54 work in conjunction is the equivalent of incorporating the intelligent elision routine 54 into the user interface routine 50.

The user interface routine 50 is structured to reduce the length of a text string 62 that is to be presented in a limited space 80 by replacing at least one language object 55 having an associated abbreviated language object 56 with the associated abbreviated language object 56 thereby creating an abbreviated text string 63. If there are multiple abbreviatable language objects 55A in the text string 62, the user interface routine 50 is structured to replace those abbreviatable language objects 55A having a lower associated preference object 57 first. If two or more abbreviatable language objects 55A have the same associated preference object 57, the user interface routine 50 is structured to replace the longest abbreviatable language objects 55A first. Further, after the abbreviated text string 63 is created, the user interface routine 50 is structured to determine if the abbreviated text string 63 is longer than the limited space 80 and, if so, replace another abbreviatable language object 55A with the associated abbreviated language object 56. This cycle is repeated until the abbreviated text string 63 fits within the limited space 80 or until there are no abbreviatable language objects 55A in the abbreviated text string 63.

The following are examples of intelligent elision that may be performed by the user interface routine 50. If the limited space 80 for presenting a return address 90 had a length of fifteen characters, the text string 62 "Enrico.Pallazzo@opera.com" would be abbreviated to be the abbreviated text string 63 "Enrico.Pallazzo". In this example, as discussed above, the text string 62 for the return address 90, i.e. "Enrico.Pallazzo@opera.com," would be temporarily added to the plurality of abbreviatable language objects 55A and the associated abbreviated language object 56, "Enrico.Pallazzo" would be created by truncating the text string 62 after the "@." The associated abbreviated language object 56, "Enrico.Pallazzo" would further be added temporarily to the plurality of abbreviated language objects 56. The user interface routine 50 would determine that the original text string 62 was longer than the limited space 80 and replace the abbreviatable language objects 55A with the associated abbreviated language object 56. Further, if the limited space 80 was even shorter, the name "Enrico" could be abbreviated as an initial as discussed above.

If the limited space 80 for presenting a subject line 92 had a length of forty-five characters, the text string 62 "The Law School Admission Test has been moved to Lancaster Hall, Room 101 on Tuesday" was provided as a subject line 92, the user interface routine 50 would create the abbreviated text string 63, "LSAT moved to Lancaster Hall, Rm 101 on Tues" which has forty-four characters.

The operation of the preference objects 57 is as follows. Using the subject line 92 example above, each abbreviatable language object 55A has the associated abbreviated language object 56 and an associated preference object 57 as set forth bellow.

| Language Object | Abbreviated Language Object | Preference Object (Rank) |
|---|---|---|
| The | Null | 1 |
| Law School Admission Test | LSAT | 2 |
| has | Null | 3 |
| been | Null | 3 |
| to | Null | 3 |
| Room | Rm | 3 |
| on | Null | 3 |
| Tuesday | Tues | 2 |

Thus, the user interface routine 50 would first replace the abbreviatable language object 55A "the" with a null abbreviated language object 56, that is, nothing, as the abbreviatable language object 55A "the" has the lowest associated preference object 57. The user interface routine 50 would then determine if the abbreviated text string 63 fits in the limited space 80. As it does not, the user interface routine 50 would determine that there are two abbreviatable language objects 55A having an associated preference object 57 rank of "2." Accordingly, the user interface routine 50 would replace the longer abbreviatable language object 55A, in this example, "Law School Admission Test" with the associated abbreviated language object 56, "LSAT." Again, the user interface routine 50 would then determine if the abbreviated text string 63 fits in the limited space 80. As it still does not, the user interface routine 50 would determine that there is only one remaining abbreviatable language object 55A having an associated preference object 57 rank of "2," namely the word "Tuesday." Thus, the user interface routine 50 replaces this abbreviatable language object 55A with the associated abbreviated language object 56, "Tues." This process is repeated until the abbreviated text string 63 fits in the limited space 80.

It is noted that in this example, the abbreviatable language objects 55A "been" and "on" both have a null associated abbreviated language object 56 and an associated preference object 57 of "3." As the user interface routine 50 replaces the longer abbreviatable language objects 55A first, the abbreviatable language object 55A "on" remains in the abbreviated text string 63. It is further noted that certain language objects 55, e.g. "Lancaster" and "Hall," do not have associated abbreviated language objects 56. Thus, these language objects 55 would never be replaced. If the abbreviated text string 63 does not fit in the limited space 80 even after all abbreviatable language objects 55A have been replaced, the user interface routine 50 is structured to truncate the abbreviated text string 63 as is known in the art. Finally, it is noted an abbreviated text string 63, especially with the use of non-standard abbreviated language objects 59, may not always be as clear as desired. Accordingly, as is known in the art, a the user interface routine 50 may present the original the subject line 92 in a tipstrip, or pop-up, when a user hovers a cursor, or other selection device, over the abbreviated text string 63.

Figure 4:
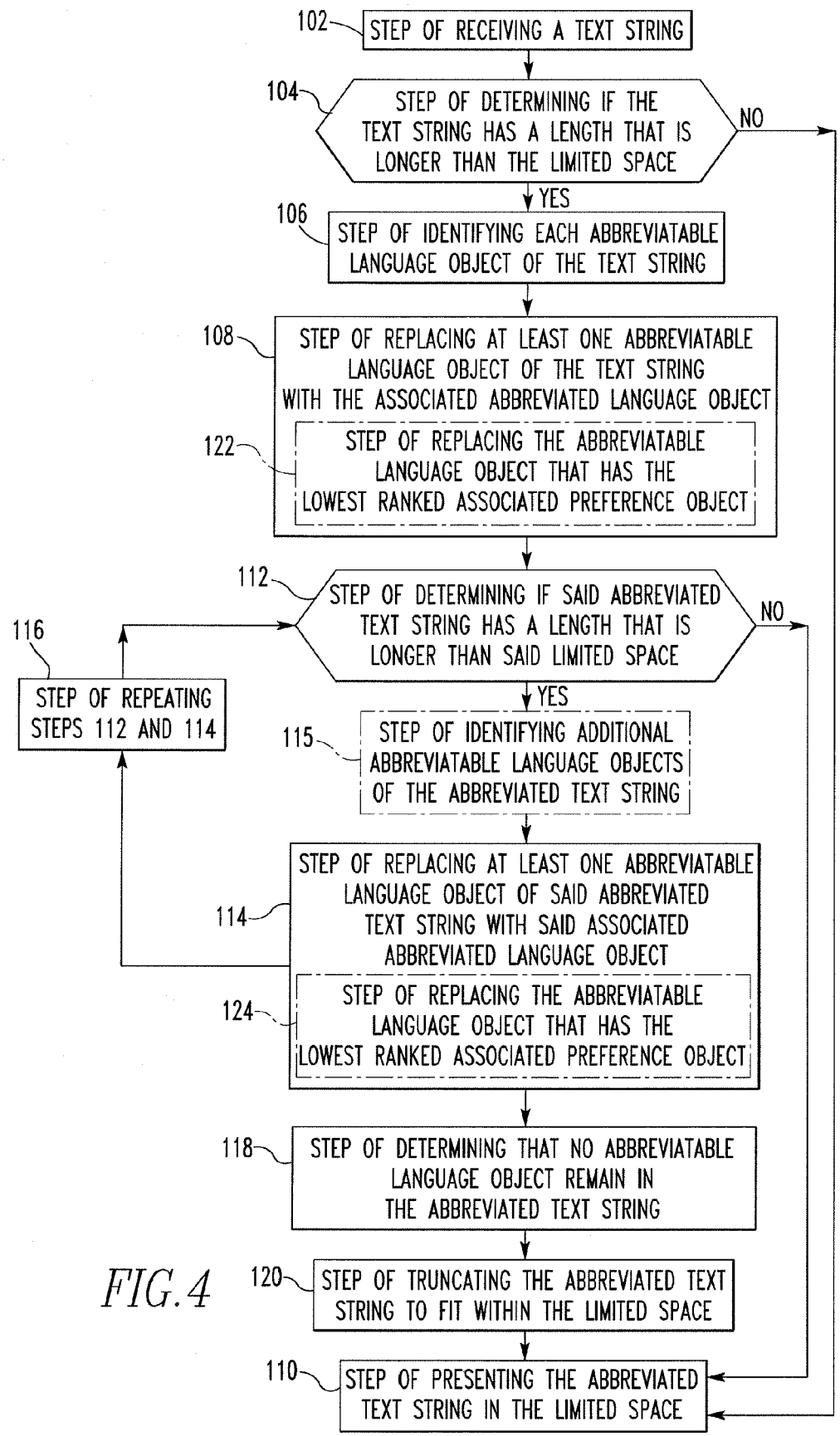
FIG. 4 is a flow chart of the steps associated with the disclosed method.

Accordingly, to use intelligent elision to provide information to a user of a handheld electronic device 4, the method includes, and the user interface routine 50 is structured to perform, the following steps, as shown in FIG. 4. Typically, the method starts with, the step of receiving 102 a text string 62 having at least one abbreviatable language object 55A, wherein the text string 62 is to be presented in a limited space 80. While the word "receiving" may be easily associated with an email routine 44, as used herein, it is also applicable to a text string 62 provided by a user inputting text to other routines 44 such as, but not limited to, making an entry in a calendar routine 44. After the text string 62 is received 102, the method includes the steps of determining 104 if the text string 62 has a length that is longer than the limited space 80, identifying 106 each abbreviatable language object 55A of the text string 62, replacing 108 at least one abbreviatable language object 55A of the text string 62 with the associated abbreviated language object 56, thereby creating an abbreviated text string 63, and presenting 110 the abbreviated text string 63 in the limited space 80. Of course, if during the step of determining 104 if the text string 62 has a length that is longer than the limited space 80 it is determined that the text string 62 is not longer than the limited space 80, the method proceeds to the step of presenting 110 the text string 62 in the limited space 80.

As noted above, after replacing a single abbreviatable language object 55A, the abbreviated text string 63 may still be too long to be presented in the limited space 80. Accordingly, the method provides the further steps of determining 112 if the abbreviated text string 63 has a length that is longer than the limited space 80, and, then further replacing 114 at least one abbreviatable language object 55 of the abbreviated text string 63 with the associated abbreviated language object 56. As noted above, a non-standard abbreviation may include an abbreviation of two or more abbreviations. Accordingly, the method provides the optional step of identifying 115 additional abbreviatable language objects 55A of the abbreviated text string 63 which may also be replaced during the step of replacing 114 at least one abbreviatable language object 55 of the abbreviated text string 63 with the associated abbreviated language object 56. The three steps 112, 115, 114 identified in the prior sentence are repeated 116 until the abbreviated text string 63 has a length that is shorter than the limited space 80, or, until it is determined 118 that no abbreviatable language object 55A remain in the abbreviated text string 63. At that time, the abbreviated text string 63 may be truncated 120, as is known, to fit within the limited space 80. Of course, if during the step of determining 112 if the abbreviated text string 63 has a length that is longer than the limited space 80 it is determined that the abbreviated text string 63 is not longer than the limited space 80, the method proceeds to the step of presenting 110 the abbreviated text string 63 in the limited space 80.

As further noted above, the method further replaces abbreviatable language objects 55A in an order based on the associated preference objects 57 and the length of each abbreviatable language objects 55A. Thus, during the step of replacing 108 at least one abbreviatable language object 55A of the text string 62 with the associated abbreviated language object 56, the method provides for replacing 122 the abbreviatable language object 55A that has the lowest ranked associated preference object 57. Further, once the text string 62 becomes the abbreviated text string 63 and during the repeating cycle of reducing the length of the abbreviated text string 63 until the abbreviated text string 63 fits within the limited space 80, the method provides for replacing 124 the abbreviatable language object 55A that has the lowest ranked associated preference object 57, and, wherein, if two or more abbreviatable language objects 55A have associated preference objects 57 with the same rank, the longest of the abbreviatable language objects 55A is replaced.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of providing information to a user of a handheld electronic device, the handheld electronic device including a display and a processor apparatus, the processor apparatus having a processor and a memory, the processor apparatus structured to provide output signals to the display, the memory having a plurality of routines stored therein, at least one routine structured to present a user interface, the user interface structured to present text in a limited space on the display, the limited space having a length, the memory further having a plurality of objects stored therein, the plurality of objects including a plurality of abbreviatable language objects and a plurality of abbreviated language objects, each of the plurality of abbreviatable language objects having an associated abbreviated language object, the method comprising:

a) receiving a text string having at least one abbreviatable language object, the text string to be presented in the limited space;

b) determining that the text string has a length that is longer than the limited space;

c) identifying each abbreviatable language object in the text string;

d) replacing at least one abbreviatable language object of the text string with an associated abbreviated language object stored in the memory, thereby creating an abbreviated text string, wherein each abbreviated language object stored in the memory is associated with a respective preference object having a ranking from lowest to highest, and wherein the ranking is based on, in part, the length in number of characters of the associated abbreviatable language object, the abbreviatable language objects being replaced in an order based on associated preference object ranking; and e) presenting the abbreviated text string in the limited space at the display.

2. The method of claim 1 wherein, prior to the step of presenting the abbreviated text string in the limited space, the method includes the further steps of:
- f) determining that the abbreviated text string has a length that is longer than the limited space; and
- g) further replacing at least one abbreviatable language object of the abbreviated text string with the associated abbreviated language object.

3. The method of claim 2 wherein, prior to the step of presenting the abbreviated text string in the limited space, the method includes the further step of: repeating steps f) and g) until the abbreviated text string has a length that is shorter than the limited space.

4. The method of claim 3 wherein, prior to the step of presenting the abbreviated text string in the limited space, the method includes the further steps of:
- h) determining that no abbreviatable language objects remain in the abbreviated text string; and
- i) truncating the abbreviated text string sufficiently to be presented in the limited space.

5. The method of claim 3 wherein the step of repeating steps f) and g) until the abbreviated text string has a length that is shorter than the limited space includes, for each cycle, the step of:
- replacing the abbreviatable language object that has the next lowest ranked associated preference object; and
- wherein, if two or more abbreviatable language objects have associated preference objects with the same rank, the longest of the abbreviatable language objects is replaced.

6. The method of claim 5 wherein the plurality of abbreviated language objects includes non-standard abbreviated language objects.

7. The method of claim 5 wherein the plurality of abbreviated language objects includes null abbreviated language objects.

8. The method of claim 1 wherein the plurality of abbreviated language objects includes non-standard abbreviated language objects.

9. The method of claim 1 wherein the plurality of abbreviated language objects includes null abbreviated language objects.

10. A handheld electronic device comprising:
a processor, a memory and a display;
the processor configured to:
- receive a text string having a plurality of language objects including at least one abbreviatable language object, the text string to be presented in a limited space at the display;
- determine that the text string has a length that is longer than the limited space;
- identify each abbreviatable language object in the text string;
- replace at least one abbreviatable language object of the text string with an associated abbreviated language object stored in the memory, thereby creating an abbreviated text string, wherein each abbreviated language object stored in the memory is associated with a respective preference object having a ranking from lowest to highest, and wherein the ranking is based on, in part, the length in number of characters of the associated abbreviatable language object, the abbreviatable language objects being replaced in an order based on associated preference object ranking; and,
- present the abbreviated text string in the limited space.

11. The handheld electronic device of claim 10 wherein, prior to presenting the abbreviated text string in the limited space, the processor is further configured to:
- determine that the abbreviated text string has a length that is longer than the limited space; and
- replace at least one abbreviatable language object of the abbreviated text string with the associated abbreviated language object.

12. The handheld electronic device of claim 11 wherein, the processor is further configured to repeat replacing the abbreviatable language objects of the abbreviated text string with next lowest associated abbreviated language objects, until the abbreviated text string has a length that is shorter than the limited space.

13. The handheld electronic device of claim 12, wherein the processor is further configured to determine that no abbreviatable language objects remain in the abbreviated text string and truncate the abbreviated text string sufficiently to be presented in the limited space.

14. The handheld electronic device of claim 10 wherein the abbreviated language objects includes non-standard abbreviated language objects.

15. The handheld electronic device of claim 10 wherein the abbreviated language objects includes null abbreviated language objects.

16. The handheld electronic device of claim 10, wherein when two or more abbreviatable language objects have associated preference objects with a same rank, the longest of the abbreviatable language objects is replaced.

* * * * *